(12) United States Patent
Nakayama et al.

(10) Patent No.: US 7,586,056 B2
(45) Date of Patent: Sep. 8, 2009

(54) RESIN MOLDED BODY, RECEIVING JIG AND METHOD FOR MANUFACTURING PUSH BUTTON SWITCH MEMBER

(75) Inventors: Tomohiro Nakayama, Saitama (JP); Norio Suzuki, Saitama (JP)

(73) Assignee: Shin-Etsu Polymer Co., Ltd, Tokyo (JP)

( * ) Notice: Subject to any disclaimer, the term of this patent is extended or adjusted under 35 U.S.C. 154(b) by 0 days.

(21) Appl. No.: 11/853,512

(22) Filed: Sep. 11, 2007

(65) Prior Publication Data

US 2008/0067051 A1 Mar. 20, 2008

(30) Foreign Application Priority Data

Sep. 15, 2006 (JP) ............... 2006-250850

(51) Int. Cl.
*H01H 1/10* (2006.01)

(52) U.S. Cl. ........................... 200/512; 200/5 A

(58) Field of Classification Search .......... 200/512
See application file for complete search history.

(56) References Cited

U.S. PATENT DOCUMENTS 3,823,309 A * 7/1974 Caruso ............... 235/145 R
6,207,912 B1 * 3/2001 Persson ............... 200/305
2007/0000766 A1 * 1/2007 Yang et al. ............ 200/341

FOREIGN PATENT DOCUMENTS

JP 08-183072 7/1996

* cited by examiner

*Primary Examiner*—Lincoln Donovan
*Assistant Examiner*—Lheiren Mae A Anglo
(74) *Attorney, Agent, or Firm*—Mark Montague; Cowan, Liebowitz & Latman, P.C.

(57) ABSTRACT

To separate resin molded parts that are used for a push button switch member with less light leakage from the side faces and less trouble in key operation, easily, a resin molded body comprises one or more resin molded parts for a push button switch member, a frame surrounding the outside of the resin molded parts, one or more gates connecting a plurality of the resin molded parts each other or the resin molded part to the frame and one or more runners crossing the longitudinal direction of the gates, wherein the gates are connected at the back faces of the resin molded parts not to be coated with light shielding paint, and wherein the runners are connected to the gates on the same surfaces as the resin molded parts are connected to and are connecting the opposing sides of the frame.

13 Claims, 17 Drawing Sheets

RESIN MOLDED BODY, RECEIVING JIG AND METHOD FOR MANUFACTURING PUSH BUTTON SWITCH MEMBER

CLAIM OF PRIORITY

The present invention contains subject matter related to and claims the benefit of Japanese Patent Application No. 2006-250850, filed in the Japan Patent Office on Sep. 15, 2006, the entire contents of which being incorporated herein by reference.

BACKGROUND OF THE INVENTION

The present inventions relate to a resin molded body, its receiving jig and a method for manufacturing a push button switch member using the resin molded body and the receiving jig.

In a conventional method, a plurality of resin molded parts has been manufactured by processes comprised of: (i) a process for forming a resin molded body, wherein the resin molded body comprises a plurality of resin molded parts connected at its side faces each other by gates (hereinafter called "side gates"); and (ii) a process for separating the resin molded parts from the side gates of the resin molded body.

For example, Japanese Patent Laid-Open Publication No. H08-183072 discloses a resin molded body having runners, wherein the resin molded parts and the runners are connected by the side gates of the parts. The conventional method has been used for manufacturing a push button switch member of a cellular phone and the like.

Recently, some of cellular phones have front parts with top faces which are illuminated by a light source arranged at the back faces of the front parts. The front parts are manufactured as following processes. First, a resin molded body having transparent resin molded parts for a push button switch member is produced. Then, the top faces and the side faces of the transparent resin molded parts are coated with light shielding paint except for predetermined part of the top faces which are designed to be bright. Finally, the resin molded parts are separated from the resin molded body.

Using the above method for manufacturing the front parts from the resin molded body having the side gates, some region of the side faces of the resin molded parts are not painted with light shielding paint, because the places to where the side gates were connected were not painted with the paint in the coating process. In case of using the front parts as a push button switch member, light leaks through the non-painted regions from back side.

In order to meet the needs of size reduction of a cellular phone, a clearance between keys which are major front parts of the push button switch members, is becoming extremely narrow. In case of using the front parts manufactured from the resin molded body having the side gates, a part of the gates is remained and causes a trouble in key operation. As a solution for the light leakage and for the trouble in key operation, resin molded parts would be manufactured from a resin molded body having gates connected at back face of each resin molded part (hereinafter called "overlap gates"). The back faces of resin molded parts to where the overlap gates would be connected are not needed to be coated by light shielding paint. By using the overlap gates, the light leakage from the non-coating regions of the side faces of the resin molded parts would not occur. In other respect, since the overlap gates remain only on the back faces of resin molded parts, the resin molded parts remained on the back faces do not cause any troubles in case of operating closely arranged keys.

However, an efficient method for separating the overlap gates and the resin molded parts have not been developed yet, and there is a need of an easy method for separating resin molded parts from the resin molded body in a short time.

SUMMARY OF THE INVENTION

It is an object of the present invention to easily separate resin molded parts which are used for a push button switch member with less light leakage from the side faces and less trouble in key operation.

The present invention is a resin molded body having resin molded parts for a push button switch member and a frame surrounding an outside of the resin molded parts. The resin molded body of the present invention comprises one or more gates connecting a plurality of the resin molded parts each other or between the resin molded parts and the frame, wherein the gates are connected at the back faces of the resin molded parts not to be painted with light shielding paint. The resin molded body of the present invention also comprises one or more runners crossing the longitudinal direction of the gates wherein the runners are connected to the gates on the same faces where the resin molded parts are connected to and wherein the runners connect the opposing sides of the frame.

The runners provided in the resin molded body make it possible that vibration applied to the resin molded body transmits to each gate through the runners, and that the resin molded parts are separated off in a short time.

The other embodiment of the present invention is the resin molded body wherein at least either one of the thicknesses or the widths of the runners are smaller than either one of the gates, and wherein the widths of the runners connecting to the gates are wider than the widths of the runners non-connecting to the gates.

Wider area connecting to the gates (hereinafter, called "connecting portions") make the connecting strength of the gates to the runners enhanced. In the resin molded body according to this embodiment of the present invention, a binding power between the gates and the runners is stronger than a binding power between the gates and the resin molded parts. In the process for separating the resin molded parts from the resin molded body, the resin molded parts are preferentially separated from the gates.

According to the other embodiment of the present invention, the runners are designed to be gradually widened in curves from non-connecting portions to the connecting portions. Such a shape prevents vibration applied to the resin molded body from concentrating to the connecting portions. Since the connections between the gates and the runners are durable, in the process of separating the resin molded parts from the resin molded body, the resin molded parts are preferentially separated from the gates.

Still the other embodiment of the present invention comprises one or more runners with the wide portions formed at non-connecting portions which connect between the gates. Thus structure makes the runners stronger. In the process of separating the resin molded parts from the resin molded body, the runners have not been destroyed until the resin molded parts are separated from the gates.

The other embodiment of the present invention comprises one or more runners with wide portions formed at non-connecting portions which connect between the gates, wherein the wide portions are designed to be gradually widened in curve. The shape of the wide portions makes the boundary portions between non-wide portions and wide portions of the runners stronger. In the process of separating the resin molded parts, the runners have not been destroyed until the resin molded parts are separated from the gates. Therefore, the resin molded parts are easily separated from the gates.

The other embodiment of the invention comprises one or more thick portions connecting the runners to the gates, wherein the thick portions are formed on the same side as the back faces of the resin molded parts. The thick portions formed between the gates and the runners make the portions connecting between the gates and the runners stronger. In the process of separating the resin molded parts, the gates and the runners are not easily separated off, while the resin molded parts and the gates are easily separated off.

Still the other embodiment of the present invention comprises a receiving jig which is used as a receiver in separating resin molded parts for a push button switch member from the resin molded body by applying vibration. The receiving jig comprises one or more projecting portions that may support at least one of the front sides of the ends of the gates, the front side of the runners and the front side of a frame. Hereinafter "the front side(s)" means the same side as the front face of the resin molded parts that is the front side of a push button switch member (the resin molded part) when it is assembled into a cellular phone. A resin molded parts in a resin molded body which are supported by the projecting portions are not connected to the receiving jig. In this embodiment of the present invention, some gates are connecting to a plurality of resin molded parts, other gates are connecting to both the resin molded parts and a frame at the back faces of the resin molded parts that are not needed to be painted. Also, in this embodiment of the present invention, the runners are crossing the longitudinal direction of the gates, the runners are connected to the gates on the same faces where the resin molded parts are connected to, and the runners are connecting to opposing sides of the frame. The receiving jig also comprises one or more concave portions that are formed inside of the projecting portions and filled with one or more elastic bodies, wherein the elastic bodies filled in the concave portions are able to support at least one of the gates, the runners and the frame in setting a resin molded body to the receiving jig.

The embodiment of the receiving jig supports at least one of the gate-ends, the runners and the frame of the resin molded body at its projecting portions, and does not contact to the resin molded parts. When vibration is applied to the resin molded body, the connecting portions between the gates and the resin molded parts are effectively vibrated. In an arrangement of a resin molded body in the receiving jig, one or more elastic bodies filled in the concave portions of the receiving jig contact to at least one of the gates, the runners and a frame of the resin molded body. When vibration is applied to the resin molded body arranged in the receiving jig, the vibration is transmitted to connecting portions between the gates and the resin molded parts which are not contacted to the elastic bodies, where the vibration is absorbed at the elastic bodies. As a result, the resin molded parts are easily separated from the gates.

The other embodiment of the present invention comprises a receiving jig which is used as a receiver when resin molded parts for a push button switch member are separated by applying vibration to a resin molded body, wherein the receiving jig comprises one or more elastic bodies on the faces contacting to a resin molded body which may support at least one of a plurality of the front sides of the ends of the gates, the front sides of runners and the front side of a frame of a resin molded body. In this embodiment of the present invention, some gates are connecting to a plurality of resin molded parts and other gates are connecting to resin molded parts and the frame at the back faces of the resin molded parts that are not needed to be painted. Also, in this embodiment of the present invention, the runners are crossing the longitudinal direction of the gates. The runners are connecting to the gates on the same side where the resin molded parts are connected to, and are connecting to opposing sides of the frame.

According to the embodiment of a receiving jig, in case of arranging a resin molded body, the elastic bodies support at least one of the gate-ends, runners and a frame. Also, a resin molded parts do not contact to the receiving jig. When vibration is applied to the resin molded body arranged in the receiving jig, the vibration is transmitted to the connecting portions between the gates and a resin molded parts which are not contacted to the elastic bodies, where the vibration is absorbed to the elastic bodies. As a result, the resin molded parts are easily separated from the gates.

Still the other embodiment of the present invention is a method for manufacturing a push button switch member using a receiving jig by separating resin molded parts for the push button switch member from a resin molded body with vibration, wherein the method includes a process of arranging the resin molded body in the receiving jig and a process of applying vibration by using vibration generating means to the gates at the same side as the back faces of the resin molded parts. The resin molded body used in the above method comprises the gates connecting a plurality of resin molded parts, a plurality of gates connecting to the resin molded parts and a frame surrounding the resin molded parts, wherein the gates are connected at the back faces of the resin molded parts where are not to be painted. The resin molded body used in the above method also comprises runners crossing the longitudinal direction of the gates, connecting to the gates on the same side where the resin molded parts are connected to, and connecting to opposing sides of the frame.

In the embodiment of the method of manufacturing a resin molded part, vibration is efficiently transmitted to the connecting portions between the gates and the resin molded parts, and the back faces of the resin molded parts are easily separated from the gates. This embodiment of the method of manufacturing the resin molded parts improves working efficiency, reduces the number of working processes, and thereby reduces manufacturing costs. This embodiment preferably includes a coating process of putting a coat at least on the resin molded parts and the gates and a cutting process of cutting in borders between the resin molded parts and the gates from the coated surface of the borders. As a result, burrs generated by the coating surface of the gates do not remain on the resin molded parts when the resin molded parts and the gates are separated off each other.

According to the present inventions, the resin molded parts are easily separated from the resin molded body in a short time. Not only light leakage from the side faces of the resin molded parts but also any troubles in key operation do not occur.

BRIEF DESCRIPTION OF THE DRAWINGS

The following detailed description, given by way of example and not intended to limit the present invention solely thereto, will best be appreciated in conjunction with the accompanying drawings, wherein like reference numerals denote like elements and parts, in which.

DETAILED DESCRIPTION OF THE PREFERRED EMBODIMENTS

First Embodiment of the Present Invention

Hereinafter, a first embodiment of the present invention will be described with referent to the drawings.

Figure 1A:
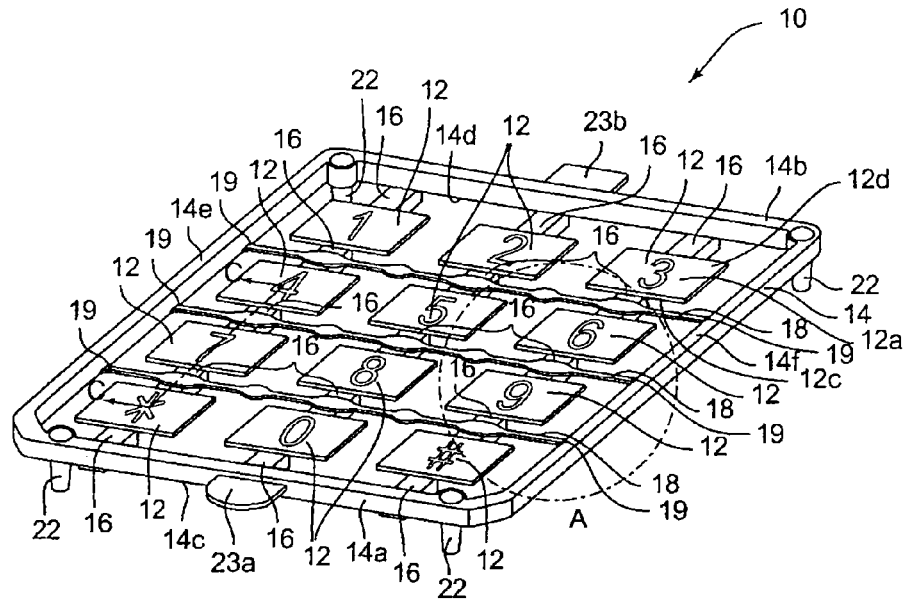
FIG. 1A shows a perspective view from the front side illustrating configuration of a resin molded body according to a first embodiment of the present invention.
Figure 1B:
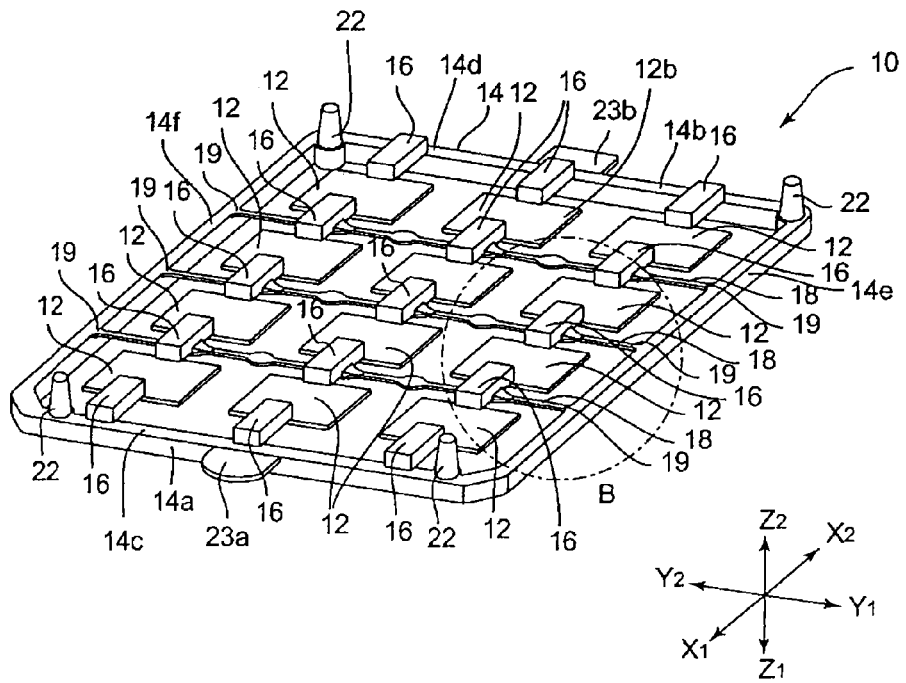
FIG. 1B shows a perspective view from the back side illustrating configuration of a resin molded body according to a first embodiment of the present invention.
Figure 2A:
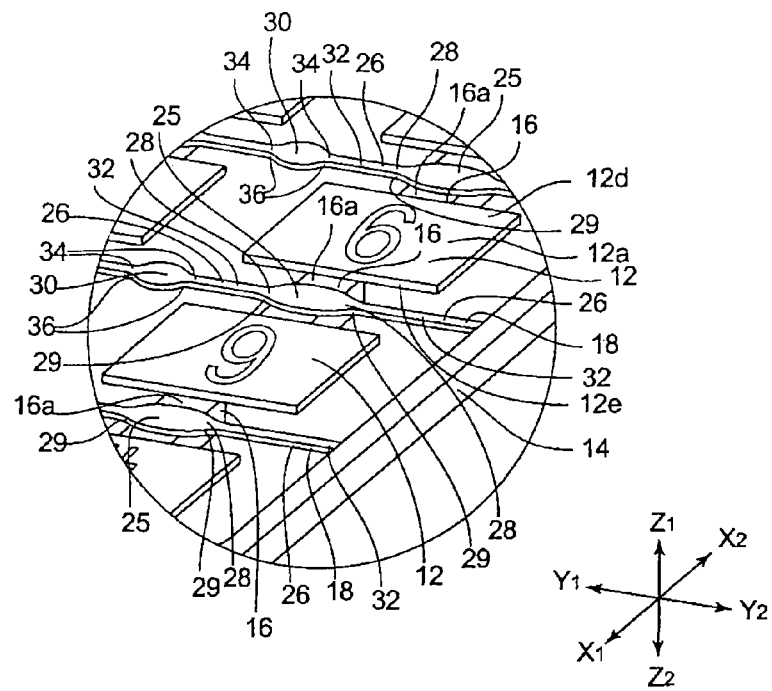
FIG. 2A shows an enlarged view of a portion surrounded by a dashed-dotted line A in FIG. 1A.
Figure 2B:
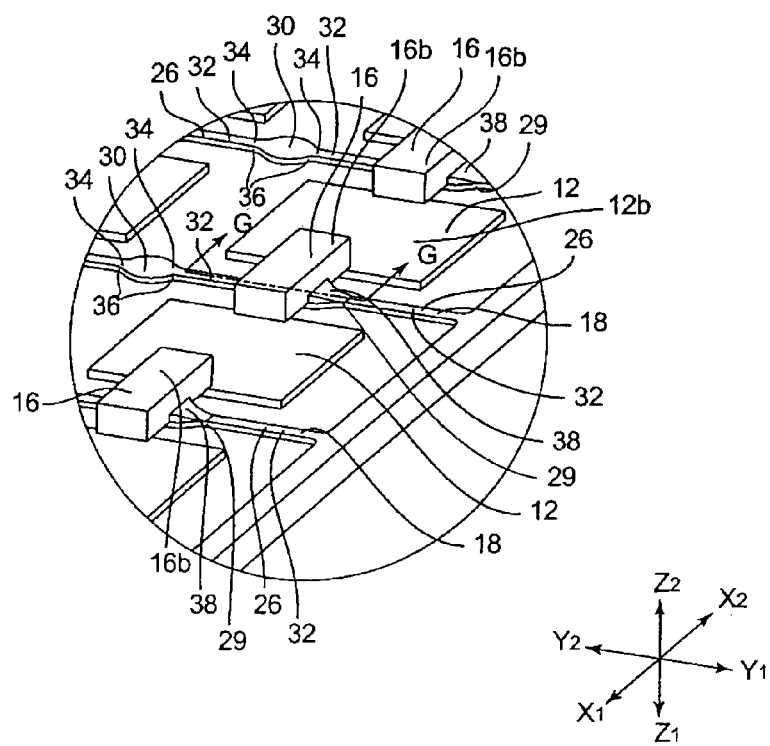
FIG. 2B shows an enlarged view of a portion surrounded by a dashed-dotted line B in FIG. 1B.
Figure 3:
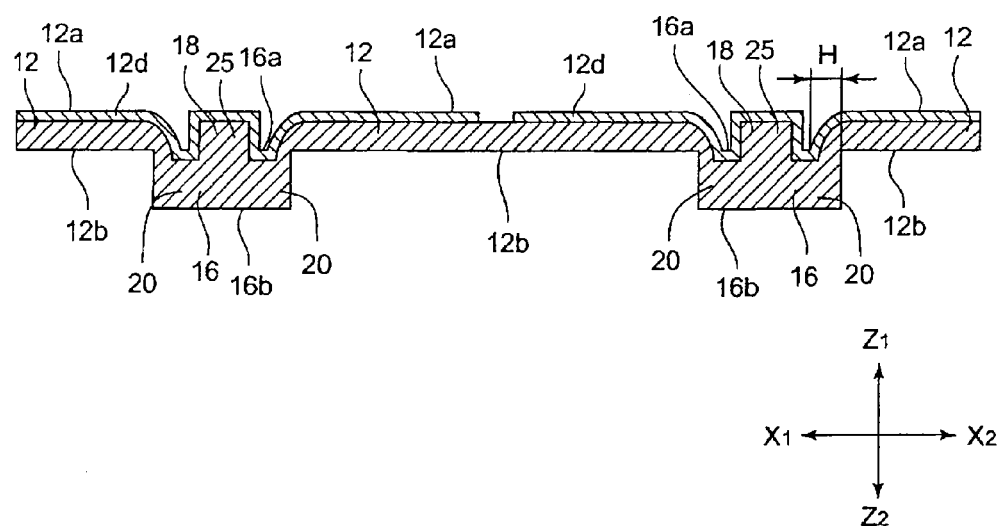
FIG. 3 shows a cross sectional view of a resin molded body according to the first embodiment of the present invention along the line C-C in FIG. 1A.
Figure 4:
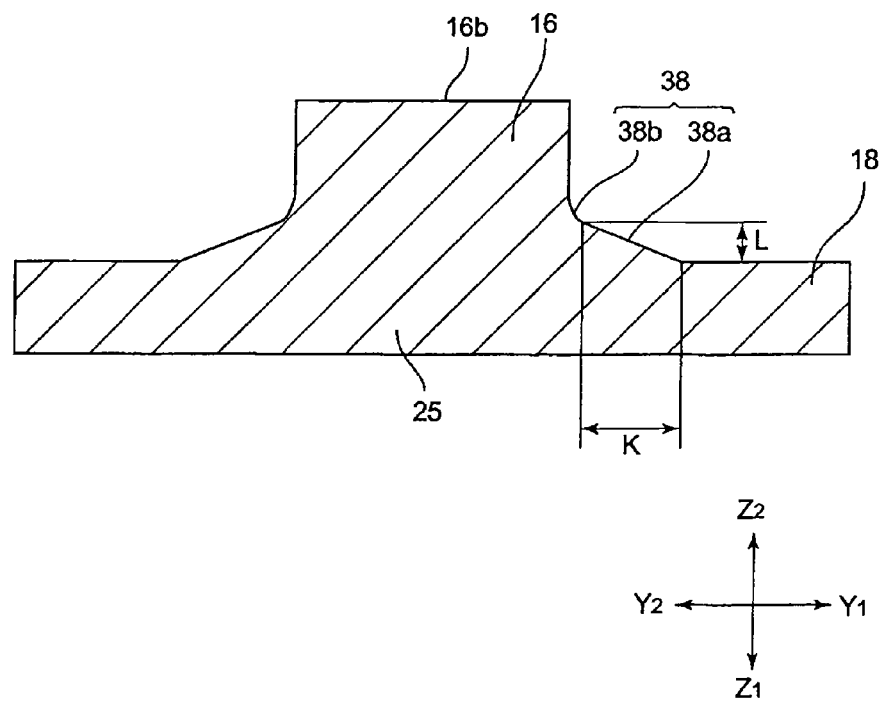
FIG. 4 shows a cross sectional view of a resin molded body according to the first embodiment of the present invention along the line G-G line in FIG. 2B.

FIG. 1A shows a perspective view from the front side illustrating configuration of the resin molded body 10 according to the first embodiment. FIG. 1B shows a perspective view from the back face illustrating configuration of the resin molded body 10 according to the first embodiment. FIG. 2A shows an enlarged view of a portion surrounded by a dashed-dotted line A in FIG. 1A. FIG. 2B shows an enlarged view of a portion surrounded by a dashed-dotted line B in FIG. 1B. FIG. 3 shows a cross sectional view of the resin molded body 10 according to the first embodiment along the line C-C in FIG. 1A. FIG. 4 shows a cross sectional view of the resin molded body 10 according to the first embodiment along the line G-G line in FIG. 2B.

As shown in FIGS. 1A and 1B, the resin molded body 10 comprises twelve resin molded parts 12 (hereinafter referred to as "a part 12" or "parts 12") for the push button switch member, a frame 14 surrounding an outside of the parts 12, overlap gates 16 (hereinafter referred to as "a gate 16" or "gates 16") connecting to back faces of the parts 12 (hereinafter referred to as "a back face 12b" or "back faces 12b") or connecting to the back faces 12b and the frame 14, and runners 18 connecting to the plurality of gates 16 and connecting to the opposing sides of the frame 14.

The resin molded body 10 is formed by integral molding of a resin material. The material forming the resin molded body 10 includes polyethylene (PE), polypropylene (PP), polybutylene (PB), polyvinylidene chloride (PVDC), chlorinated polyvinyl chloride (PVC-C), polystyrene (PS), polycarbonate (PC), styrene/acrylonitrile resin (SAN), acrylonitrile/butadiene/styrene resin (ABS) and the like, but is not limited to the above materials.

As shown in FIGS. 1A and 1B, the parts 12 are arranged inside of the frame 14 in four rows and three columns with specified intervals. Each part 12 has a rectangular flat-plate shape. On a front surface 12a and a forward side surface 12c, a rearward side surface 12c, a left side surface 12c and a right side surface 12c (hereinafter collectively referred to as "a side surface 12c") of the part 12, a coated layer 12d is formed by applying paint. On the front surface 12a of the part 12, numbers from "0" to "9" and symbols of "*" and "#" are formed by etching or the like. The parts 12 adjacent to a forward-and-rearward direction are connected by the gates 16. Six parts 12 arranged at the most forward row and the most rearward row are connected to the frame 14 by the gates 16. Each gate 16 is connected substantially to the center in the right-and-left direction of the part 12.

As shown in FIGS. 2A, 2B and 3, the gate 16 has a substantially rectangular shape. There is no limitation for the size of the gate 16. As shown in FIG. 3, at the both forward-and-rearward direction ends 20 of a front surface 16a of the gate 16, the gate 16 is connecting to the part 12 at the outer edge of the back surface 12b of the part 12. An overlap indication H that corresponds to the length of this connecting portion in the forward-and-rearward direction is not limited but preferably a value in a range from 0.15 to 0.30 mm.

As shown in FIGS. 1A and 1B, the frame 14 is a square frame with a square shaped cross-section. At vicinity of each of four corners in the frame 14, a projection 22 is provided toward downside. At a forward frame portion 14a and a rearward frame portion 14b of the frame 14, a flat-plate portion 23a and a flat-plate portion 23b are extended toward forward and rearward, respectively. Three parts 12 arranged at the most forward position and the forward frame portion 14a are connected by the gates 16. The gates 16 and the forward frame portion 14a are connected in a manner that the front surface 16a of the gate 16 is contacting to a back face 14c of the forward frame portion 14a. Also, three parts 12 arranged at the most rearward position and the rearward frame portion 14b are connected by the gates 16. The gates 16 and the rearward frame portion 14b are connected in a manner that the front faces 16a of the gates 16 are contacting to a back face 14d of the rearward frame portion 14b.

As shown in FIGS. 1A and 1B, between the parts 12 adjacent to the forward-and-rearward direction, runners 18 connecting a left frame portion 14e and a right frame portion 14f each other are provided along the right-and-left direction. The runner 18 is gradually widened toward a connecting portion 19 of the runner 18 where the runner 18 is connected to the left frame portion 14e and toward a connecting portion 19 of the runner 18 where the runner 18 is connected to the right frame portion 14f. A juncture portion of the runner 18 is formed between the connecting portion 19 and a non-connecting portion 26, wherein the non-connecting portion 26 is a portion of the runner 18 where the runner 18 is not connected to the gate 16 or to the frame 14 and where the runner 18 has the same width. The juncture portion has a curve shape with a value of a curvature radius R in a range from 0.5 to 1.0 mm (R0.5 to R1.0).

As shown in FIG. 2A, the runners 18 cross the gates 16 provided along the forward-and-rearward direction and are connected to the front faces 16a of the gates 16 at the connecting portions 25. The connecting portions 25 are wider in the forward-and-rearward direction than the non-connecting portions 26. At juncture portions 28 of the runners 18 placed between the connecting portions 25 and the non-connecting portions 26, curve portions 29 where the runners 18 are gradually widened from the non-connecting portions 26 toward the connecting portions 25 are formed. A value of a curvature radius R of the curve portions 29 is preferably but not limited to in a range from 2.0 to 4.0 mm (R2 to R4).

At the substantially central position between the connecting portions 25 of the runner 18, a wide portion 30 is formed, wherein the wide portion 30 is wider in the forward-and-rearward direction than the non-connecting portion 26. The runner 18 is gradually widened from the non-connecting portion 26 to the wide portion 30. Between the wide portion 30 and a narrow width portion 32 that is the portion of the runner 18 where the runner 18 starts to widen from the non-connecting portion 26 to the wide portion 30, the runner 18 has a boundary portion 34. At the boundary portion 34 of the runner 18, a curve portion 36 is formed. At the curve portion 36, the runner 18 is gradually widened from the narrow width portion 32 to the wide portion 30. A value of a curvature radius R of the curve portion 36 is preferably but not limited to in a range from 2.0 to 4.0 mm (R2 to R4).

As shown in FIG. 2B, on the back face of the runner 18 between the connecting portion 25 and the non-connecting portion 26, a thick portion 38 is provided, wherein the thick portion 38 is thickened in front to back direction gradually from the non-connecting portion 26 toward the connecting portion 25. As shown in FIG. 4, the thick portion 38 comprises a flat incline portion 38a having a flat inclined face and a curve portion 38b having a curve inclined face which is continued from the flat incline portion 38a. The flat incline portion 38a is provided to incline backward from the back face of the runner 18 toward the gate 16. A value of a width K that is the width of the flat incline portion 38a in the right-and-left direction is preferably but not limited to in a range from 1.3 to 1.6 mm. A value of a height L that is the height of the flat incline portion 38a in the front-and-back direction is preferably but not limited to in a range from 0.2 to 0.4 mm. The curve portion 38b is provided from the flat incline portion 38a to the gate 16. A value of a curvature radius R of the curve portion 38b is preferably but not limited to in a range from 0.1 to 0.5 mm. The resin molded body 10 is formed by injection molding. A cycle of the injection molding differs depending on the molding condition and on the length in the forward-and-backward direction of a portion where the part 12 and the gate 16 are overlapped (herein after referred to as "overlap amount"). In the case of the injection molding under overlap amount of 0.3 mm and a tool temperature of 80° C., for example, the cycle of the injection molding is approximately 8.5 seconds.

In the case of separating the parts 12 for a push button switch member from the resin molded body 10, a method for applying vibration between the part 12 and the gates 16 are preferably employed. In this method, a receiving jig 40 is used to support the resin molded body 10. A construction of the receiving jig 40 will be described as follows.

Figure 5:
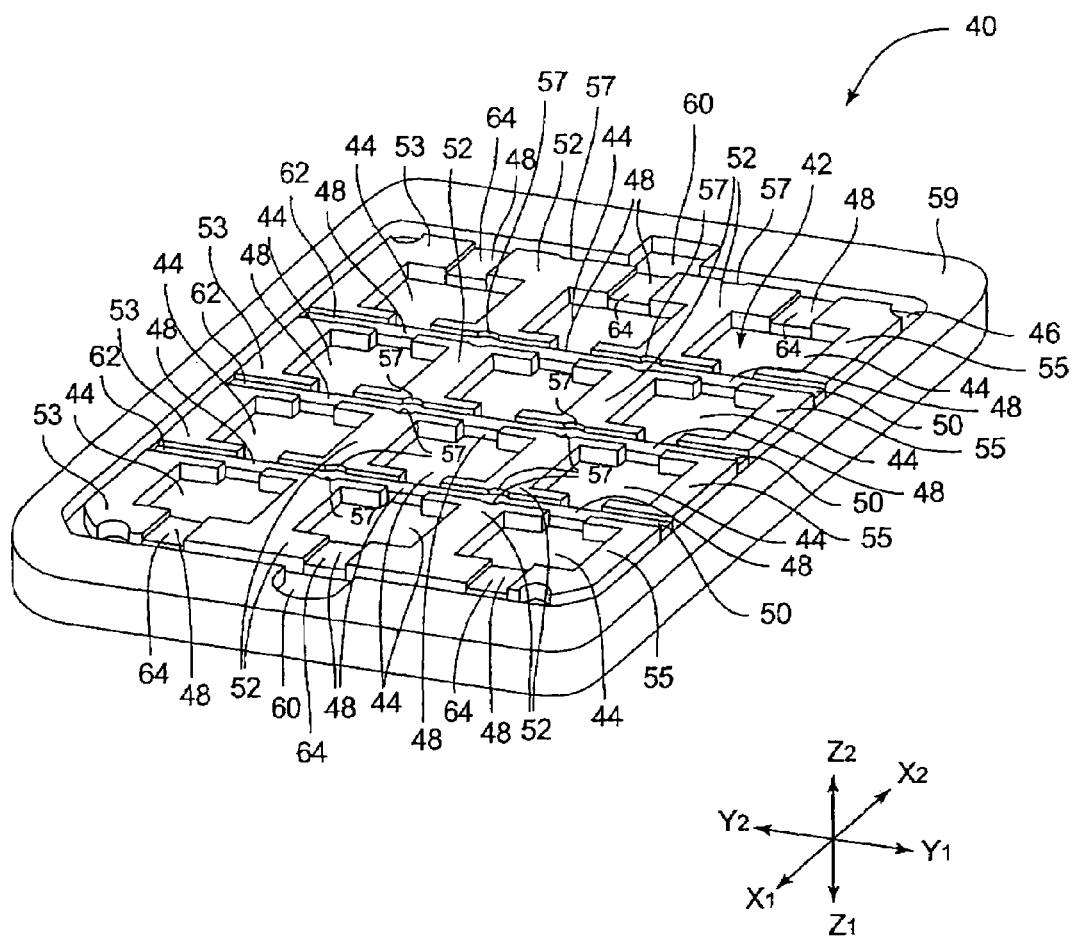
FIG. 5 shows a perspective view illustrating configuration of a receiving jig according to the first embodiment of the present invention.

FIG. 5 shows a perspective view illustrating configuration of the receiving jig 40 according to the first embodiment.

The receiving jig 40 is used as a receiver in separating the part 12 from a resin molded body 10. The receiving jig 40 mainly made from metal such as but not limited to aluminum or stainless steel.

As shown in FIG. 5, the receiving jig 40 has a cavity 42. A shape of the cavity 42 is in relation to a shape of a resin molded body 10 so that the resin molded body 10 fits into the cavity 42. In another word, the cavity 42 of the receiving jig 40 comprises concave portions at locations corresponding to a part 12, a frame 14, the gates 16 and the runners 18 of the resin molded body 10.

As shown in FIG. 5, the cavity 42 comprises part fitting concave portions 44, a frame fitting concave portion 46, gate fitting concave portions 48 and runner fitting concave portions 50 corresponding to the parts 12, the frame 14, the gates 16 and the runners 18 of the resin molded body 10, respectively.

The part fitting concave portions 44 are provided in four rows and three columns with specified intervals. The part fitting concave portion 44 has substantially same shape as the shape of the part 12. The frame fitting concave portion 46 is provided in a square frame shape surrounding the outside of the part fitting concave portions 44. The runner fitting concave portions 50 are provided along the right-and-left direction between adjacent part fitting concave portions 44. The gate fitting concave portions 48 are provided to articulate part fitting concave portions 44 each other in the forward-and-rearward direction. The gate fitting concave portions 48 are provided to articulate the six part fitting concave portions 44 placed at the most forward and most rearward position with the frame fitting concave portion 46.

Consequently, at right and left sides of the part fitting concave portion 44 located at the central column in the right-and-left direction in the cavity 42, substantially I-shaped walls 52 (herein after called "I-shaped walls 52") are provided. At left side of the part fitting concave portions 44 located at the left column, substantially left bracket shaped walls 53 (hereinafter called "the left bracket shaped walls 53") are provided, while at the right side of the part fitting concave portion 44 located at the right column, substantially right bracket shaped walls 55 (hereinafter called "the right bracket shaped walls 55") is provided. At substantially center position in right-and-left direction of the forward end of the I-shaped wall 52, an indentation from forward side to rearward side is provided at an indent portion 57. At substantially center position in right-and-left direction of the rearward end of the I-shaped wall 52, an indentation from rearward side to forward side is provided at an indent portion 57. Outside of the frame fitting concave portion 46, an outer wall 59 is provided. At the center position in right-and-left direction, the forward side and rearward side of the outer wall 59 have indented portions toward forward and toward rearward, respectively (hereinafter called "projecting concave portions 60"). The I-shaped wall 52, the right bracket shaped wall 53, the left bracket shaped wall 55 and the outer wall 59 are same height in front-and-back direction.

On the gate fitting concave portions 48 and the runner fitting concave portions 50, an elastic body 62 and an elastic body 64 are arranged, respectively. The elastic body 62 and the elastic body 64 may be made from but not limited to a resin such as silicone rubber. The elastic body 62 and the elastic body 64 are lower in front-and-back direction than the I-shaped wall 52, the right bracket shaped wall 53, the left bracket shaped wall 55 and the outer wall 59.

Next, a method for manufacturing the resin molded body 10 and a method for manufacturing a push button switch member comprising a process of separating parts 12 for the push button switch member from the resin molded body 10 by applying vibration and by using the receiving jig 40 will be described referring to the drawings.

Figure 6:
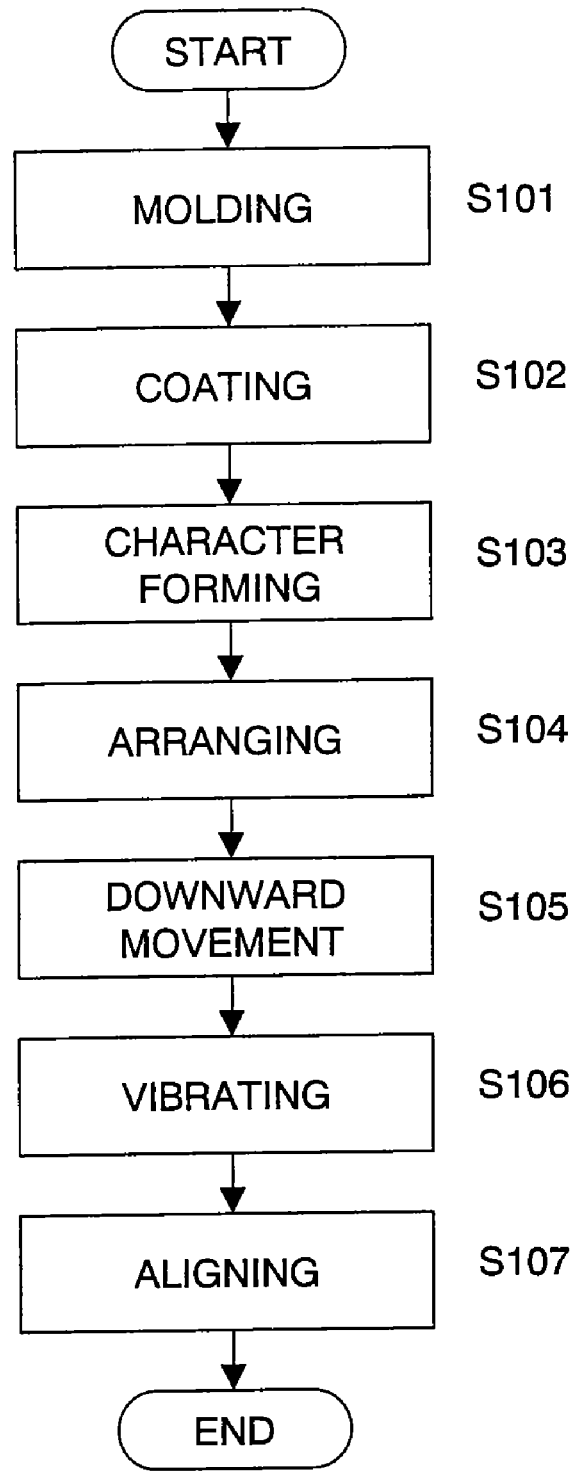
FIG. 6 is a flow chart showing processes for manufacturing a push button switch member according to the first embodiment of the present invention.
Figure 7:
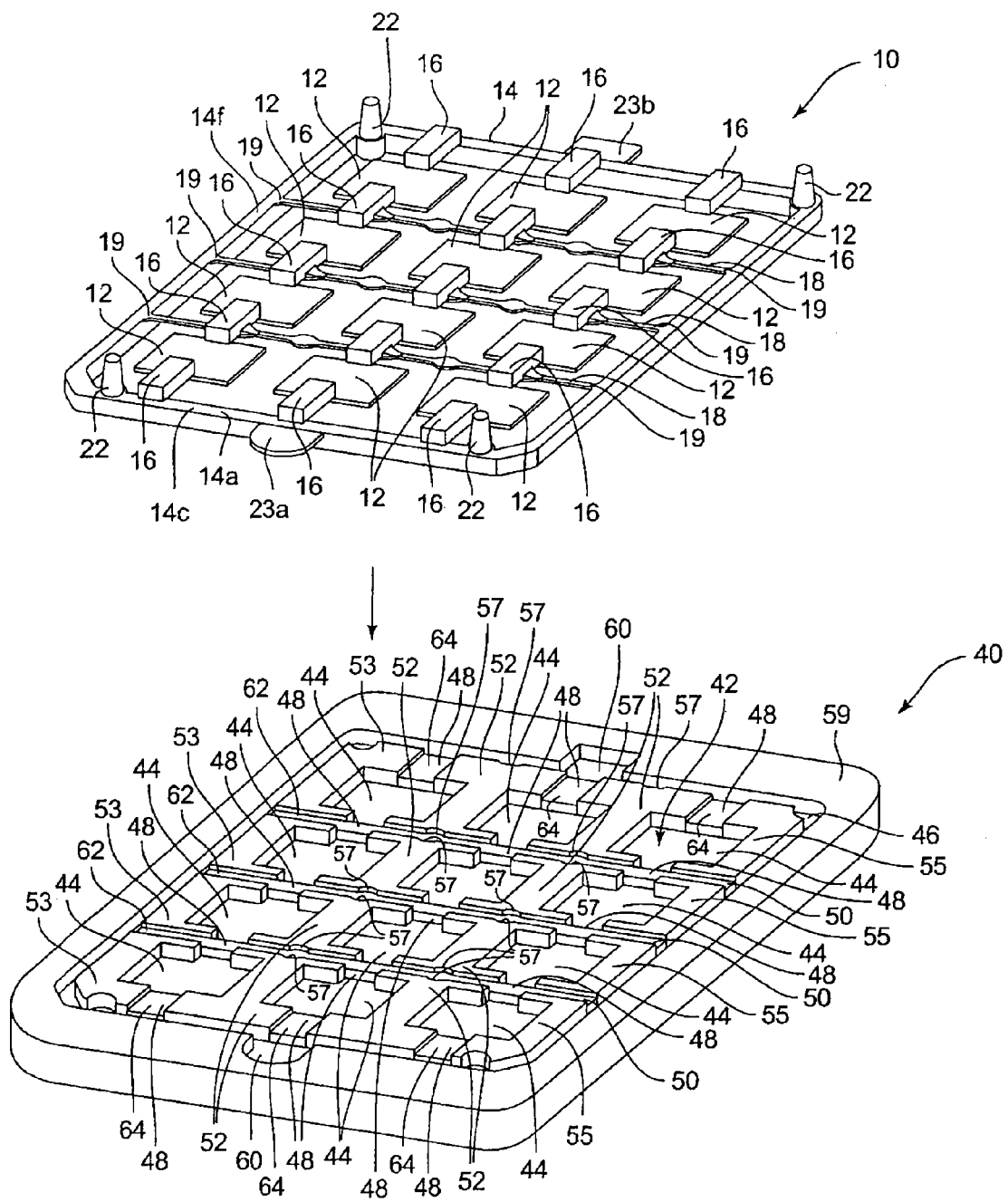
FIG. 7 shows an arranging process in the method for manufacturing the push button switch member according to the first embodiment of the present invention.
Figure 8:
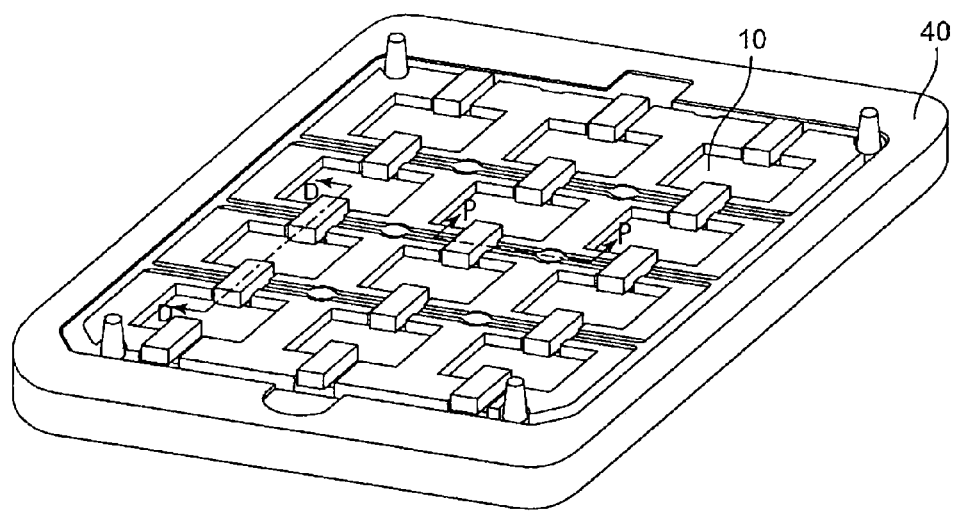
FIG. 8 shows a perspective view of the resin molded body arranged on the receiving jig.
Figure 9:
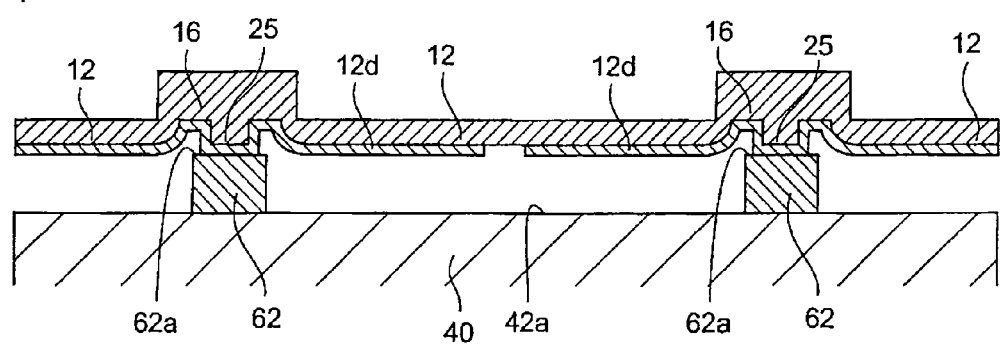
FIG. 9 shows a cross sectional view of a resin molded body according to the first embodiment of the present invention along the line D-D in FIG. 8.
Figure 10A:
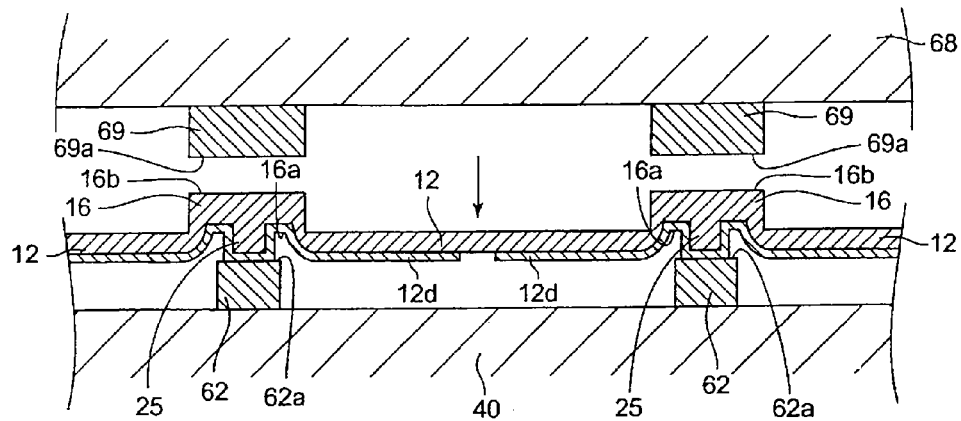
FIG. 10A shows a downward movement process in the method for manufacturing the push button switch member according to the first embodiment of the present invention.
Figure 10B:
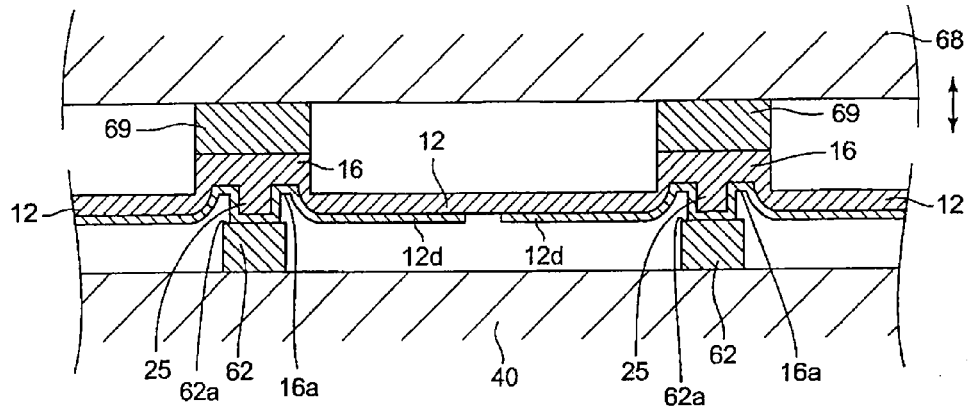
FIG. 10B shows a vibrating process in the method for manufacturing the push button switch member according to the first embodiment of the present invention.
Figure 10C:
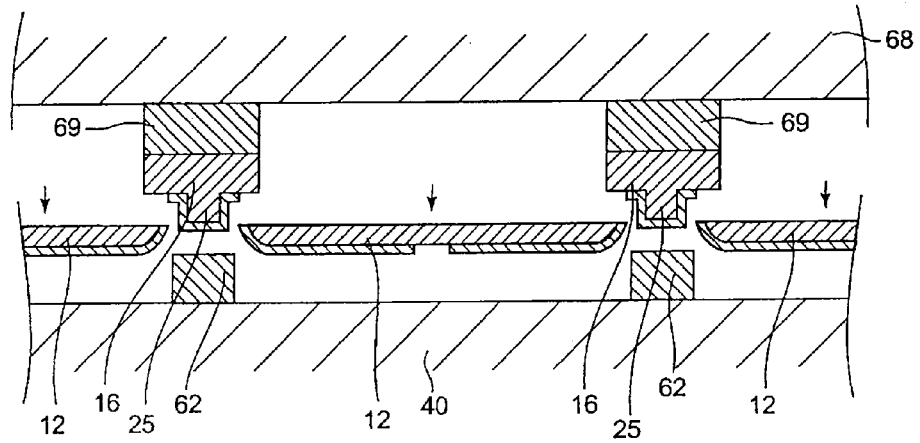
FIG. 10C shows a state that the resin molded parts are separating from the gates.

FIG. 6 shows a flow chart showing processes for manufacturing a push button switch member according to the first embodiment. FIG. 7 shows an arranging process in the method for manufacturing the push button switch member according to the first embodiment. FIG. 8 shows a perspective view of the resin molded body 10 arranged on the receiving jig 40. FIG. 9 shows a cross sectional view of the resin molded body 10 according to the first embodiment along the line D-D in FIG. 8. FIG. 10A shows a downward movement process in the method for manufacturing the push button switch member according to the first embodiment. FIG. 10B shows a vibrating process in the method for manufacturing the push button switch member according to the first embodiment. FIG. 10C shows a state that the resin molded part 12 is separating from the gate 16.

First, the method for manufacturing the resin molded body 10 will be described.

A resin molded body 10 is formed by an injection-molding with filling resin such as polycarbonate into a molding die which has cavities corresponding to the parts 12, the frame 14 and the gates 16 (resin molding process: S101). The resin used in the resin molding process is not limited to polycarbonate but preferably polyethylene (PE), polypropylene (PP), polybutylene (PB), polyvinylidene chloride (PVDC), chlorinated polyvinyl chloride (PVC-C), polystyrene (PS), styrene/acrylonitrile resin (SAN), acrylonitrile/butadiene/styrene resin (ABS) and the like.

Secondly, the front face and the side faces of the resin molded body 10 are coated by predetermined paint to form the coating layer 12d (coating process: S102). In this coating process, a plurality of paints having different colors may be over-painted. Alternatively, laser beam may be applied to the coating layer 12d, and then a transparent overcoat may be applied as a protective layer. In the case that the surface is needed to be protected by a metal layer, a deposition may be applied. The deposition belongs to "coating". Then, some parts of the coating layer 12d on the parts 12 are removed by etching or the like to form characters, symbols or patterns (character forming process: S103). These characters, symbols or patterns are formed by etching, but may be formed by any methods. The resin molded body 10 is formed through the above processes.

Next, a method for manufacturing a push button switch member will be described.

As shown in FIG. 7, the resin molded body 10 is arranged on the receiving jig 40 with the back face being upside (arranging process: S104). As shown in FIGS. 8 and 9, when the resin molded body 10 is arranged on the receiving jig 40, the gates 16 protrudes from the receiving jig 40. As shown in FIG. 9, when the resin molded body 10 is arranged on the receiving jig 40, the front faces of the connecting portions 25 of the runners 18 are in contact with the upper faces 62a of the elastic bodies 62, while the front faces of the parts 12 of the resin molded body are not in contact with the front faces 42a of the cavity 42. As described above, the resin molded body 10 is supported at the gates 16 by the elastic bodies 62 and the elastic bodies 64 of the receiving jig 40.

Then, as shown in FIG. 10A, a horn 68 of an ultrasonic vibrator is brought down from the upside (the back side) of the resin molded body 10 arranged on the receiving jig 40 (downward movement process: S105). At the end of the horn 68, a plurality of projections 69 are provided corresponding to the positions of the gates 16. As the horn 68 is brought down, an end face 69a of each projection 69 contacts to the back face 16b of the gate 16. Then, the horn 68 is pressed onto the gate 16. At the time, the connecting portion 25 is slightly pushed into the elastic body 62 (the pushed-in state is not shown in any figures). Then, as shown in FIG. 10B, ultrasonic vibration is applied (vibrating process: S106). Then, as shown in FIG. 10C, by an impact of the ultrasonic vibration applied to the gates 16 and by heat generated from the impact, the parts 12 are separated from the gates 16. The separated parts 12 are grasped by a machine or a person and aligned at a predetermined position in a predetermined assembling jig (aligning process: S107). The elastic body 62 and the elastic body 64 prevent the other portions in the resin molded body 10 from receiving a large impact and thereby being destroyed. The number of frequencies of the ultrasonic vibration applied to the gate 16 is preferably in a range from 10 to 40 kHz. Further preferable number of frequencies of the ultrasonic vibration is in a range from 15 to 30 kHz. Contacting the end face 69a of each projection 69 on the gates 16 preferably continues in a range 0.1 to 1.0 sec. Further preferable time is about 0.5 sec. The peak-to-peak amplitude of vibration of the horn 68 is preferably in a range from 40 to 80 μm in up-and-down direction. Further preferable peak-to-peak amplitude is about 60 μm. In addition, it is preferable to perform a cutting process in which cut surfaces on borders between the parts 12 and the gates 16 prior to the arranging process S104. The cutting process enables the parts 12 and the gates 16 to be clearly separated off each other. As a result, it is possible to prevent the burrs made of the coating material from remaining on the resin molded parts when the resin molded parts and the gates are separated off each other. The depth of cutting is preferably from coated surfaces to the insides of the gates 16, in particular, in a range from 0.1 to 0.3 mm from the surfaces of the gates 16. The cutting is preferably given by using a molding tool, blade or the like.

Since the resin molded body 10 formed by the above method has a runner 18 and vibration applied to the resin molded body 10 is transmitted to each gate 16 through the runners 18, the parts 12 are separated in a short time. Additionally, since the connecting portion 25 is wider than the non-connecting portion 26, the connecting strength between the gate 16 and the runner 18 is enhanced, and the gates 16 and the parts 12 are easily separated off.

The resin molded body 10 has curve portions 29 at the juncture portions 28 of the runners 18 between the non-connecting portions 26 and the connecting portions 25, wherein the curve portions 29 are gradually widened from the non-connecting portions 26 to the connecting portions 25. Thus structure prevents the vibration applied to the resin molded body 10 from concentrating to the juncture portions 28, and thereby makes the juncture portions 28 durable. As a result, the parts 12 are able to be easily separated from the gates 16.

The resin molded body 10 has wide portions 30 at substantially centers of the non-connecting portions 26 connecting the gates 16 each other. The wide portions 30 make the weakest portions in the runners 16 reinforced. Thus, during vibration is applied to the resin molded body 10, the wide portions 30 prevent the runners 18 from being destroyed before the parts 12 are separated from the gates 16.

The resin molded body 10 has curve portions at the boundary portions 34 between the wide portions 30 and the narrow width portions 32, wherein the curve portions are gradually widened from the narrow width portions 32 toward the wide portions 30. The curve portions make the strength of the boundary portions 34 further enhanced, and as a result, the parts 12 can be easily separated from the gates 16.

Also, the resin molded body 10 has the thick portions 38 on the back faces of the runners 18 between the connecting portions 25 and the non-connecting portions 26, wherein the thick portions are thickened in front-to-back direction gradually from the non-connecting portions 26 toward the connecting portions 25. The thick portions make the connecting portions 25 between the gates 16 and the runners 18 strengthened. As a result, the parts 12 are preferentially separated from the gates 16 without separating between the gates 16 and the runners 18.

On the surfaces of the parts 12 of the resin molded body 10, characters and symbols are formed by etching. The portion where the characters and symbols are formed has transparency. When the cellular phone is assembled with the parts 12 for push button switch members and with a light source placed on the back side of the parts 12, light illuminated from the light source transmits from the character formed portions and the symbol formed portions of the push button switch members. As a result, the characters and symbols can be visually recognized in a dark place. Since the side faces of the part 12 are also coated, light leakage is effectively prevented.

When the resin molded body 10 is arranged on the receiving jig 40, the elastic bodies 62 of the receiving jig 40 support the connecting portions 25 of the gates 16. When the resin molded body 10 is arranged on the receiving jig 40, the gates 16 are supported by the elastic bodies 62 and by the elastic bodies 64, while the parts 12 are not contacted with the receiving jig 40. Therefore, when vibration is applied to the resin molded body 10, the vibration is effectively transmitted to the juncture portions between the gates 16 and the parts 12. As a result, the parts 12 are easily separated from the gates 16.

In the method for manufacturing the push button switch member according to this embodiment, the resin molded body 10 is arranged on the receiving jig 40, and vibration is applied from the back faces 16b of the gates 16. Therefore, the back faces 12b of the parts 12 are easily separated from the gates 16. As a result, working efficiency is improved and the number of working processes and manufacturing costs are reduced.

Second Embodiment of the Present Invention

Hereinafter, a resin molded body 70 according to a second embodiment of the present invention will be described with referent to the drawings. In the following description about resin molded body 70 according to the second embodiment, some of common portions to the first embodiment are given the same numerals and the description of the common portions will be omitted or simplified.

Figure 11A:
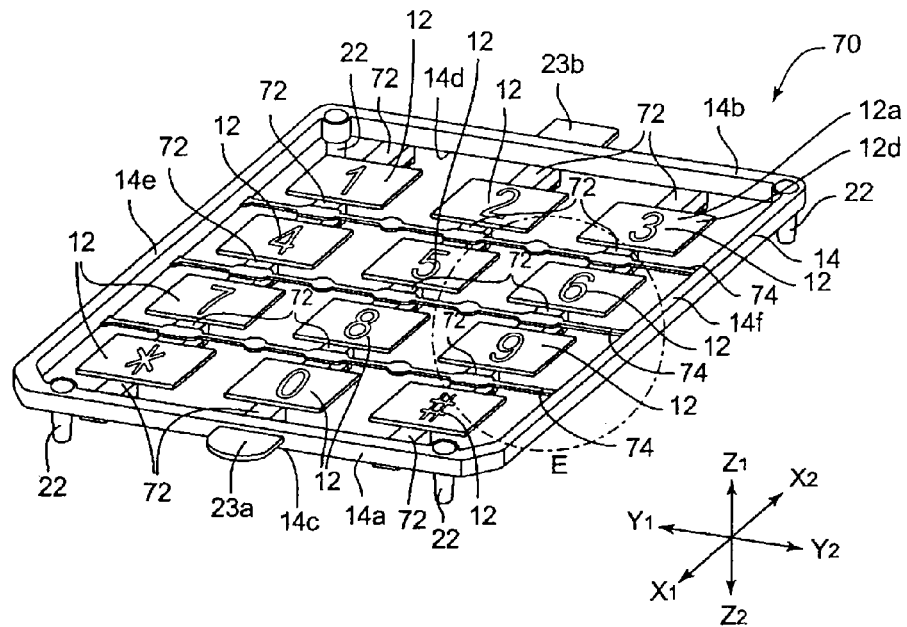
FIG. 11A shows a perspective view from the front side illustrating configuration of the resin molded body according to a second embodiment of the present invention.
Figure 11B:
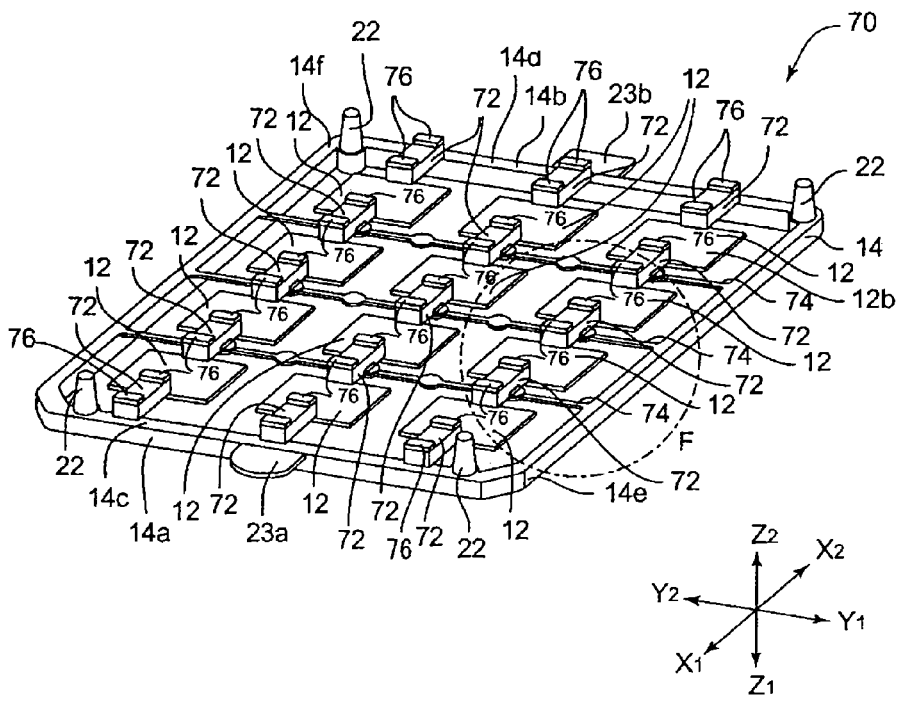
FIG. 11B shows a perspective view from the back side illustrating configuration of the resin molded body according to a second embodiment of the present invention.
Figure 12A:
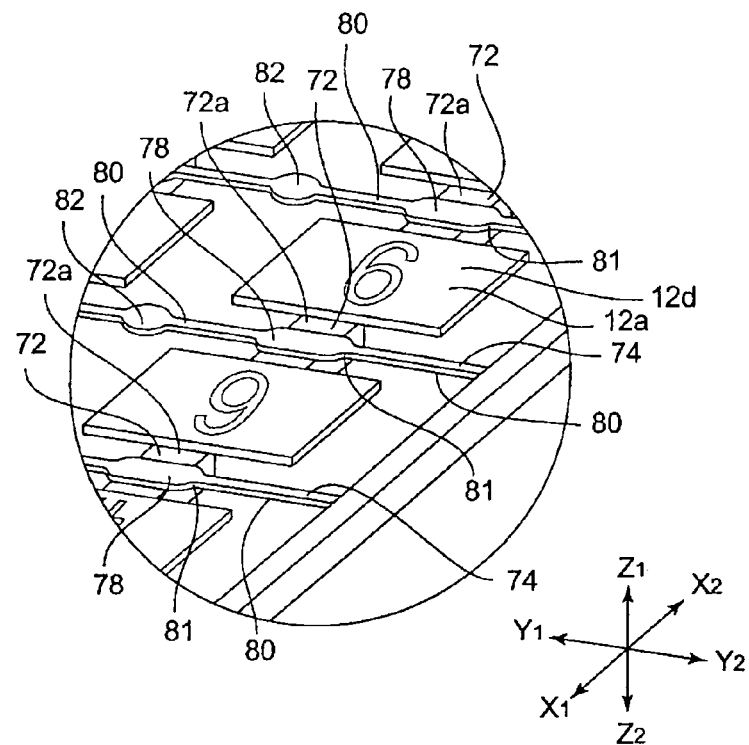
FIG. 12A shows an enlarged view of a portion surrounded by a dashed-dotted line E in FIG. 11A.
Figure 12B:
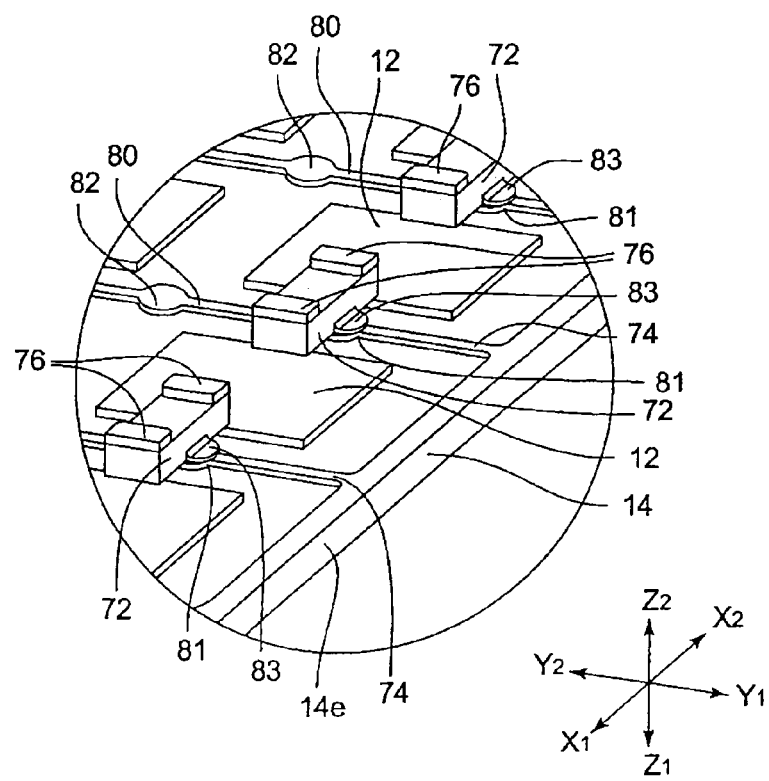
FIG. 12B shows an enlarged view of a portion surrounded by a dashed-dotted line F in FIG. 11B.

FIG. 11A shows a perspective view from the front side illustrating configuration of the resin molded body 70 according to the second embodiment. FIG. 11B shows a perspective view from the back side illustrating configuration of the resin molded body 70 according to the second embodiment. FIG. 12A shows an enlarged view of a portion surrounded by a dashed-dotted line E in FIG. 11A. FIG. 12B shows an enlarged view of a portion surrounded by a dashed-dotted line F in FIG. 11B.

As shown in FIGS. 11A and 11B, the resin molded body 70 mainly comprises twelve parts 12, a frame 14, gates 72 and runners 74.

As shown in FIGS. 11A and 11B, the parts 12 are arranged inside of the frame 14 in four rows and three columns with specified intervals. On the front surfaces 12a of the twelve parts 12, numbers from "0" to "9" and symbols of "*" and "#" are formed by etching or the like. The parts 12 adjacent to the forward-and-rearward direction are connected by the gates 72. Six parts 12 arranged at the most forward row and the most rearward row are connected to the frame 16 by the gates 72.

As shown in FIGS. 11B and 12B, the gate 72 has a substantially rectangular shape. At both forward and rearward ends on the back face of the gate 72, projections 76 projecting rearward are provided. As shown in FIGS. 11A and 11B, between the parts 12 adjacent to the forward-and-rearward direction, runners 74 connecting a left frame portion 14e and a right frame portion 14f each other are provided along the right-and-left direction.

As shown in FIG. 12A, the runners 74 cross the gates 72 provided along the forward-and-rearward direction and are connected to the front surfaces 72a of the gates 72. The connecting portions 78 of the runners 74 and the gates 72 are wider in the forward-and-rearward direction than non-connecting portions 80, wherein the non-connecting portions 80 are the portions of the runners 74 where the runners 74 are not connected to the gates 72 or to the frame 14 and where the runners 74 have the same width. At the juncture portions 81 of the runners 74 placed between the connecting portions 78 and the non-connecting portions 80, gentle curve portions are formed. At the substantially central portions between the connecting portions 78 and the non-connecting portions 80, wide portions 82 are formed, wherein the wide portions 82 are wider in the forward-and-rearward direction than the non-connecting portions 80. The wide portions 82 have substantially oval shape in a front view. On the back faces of the runners 74 between the connecting portions 78 and the non-connecting portions 80, thick portions 83 are provided in order to reinforce the connecting portions 78.

Secondly, a receiving jig 86 used as a receiver when vibration is applied to the resin molded body 70 to separate the parts 12 for the push button switch member will be described.

Figure 13:
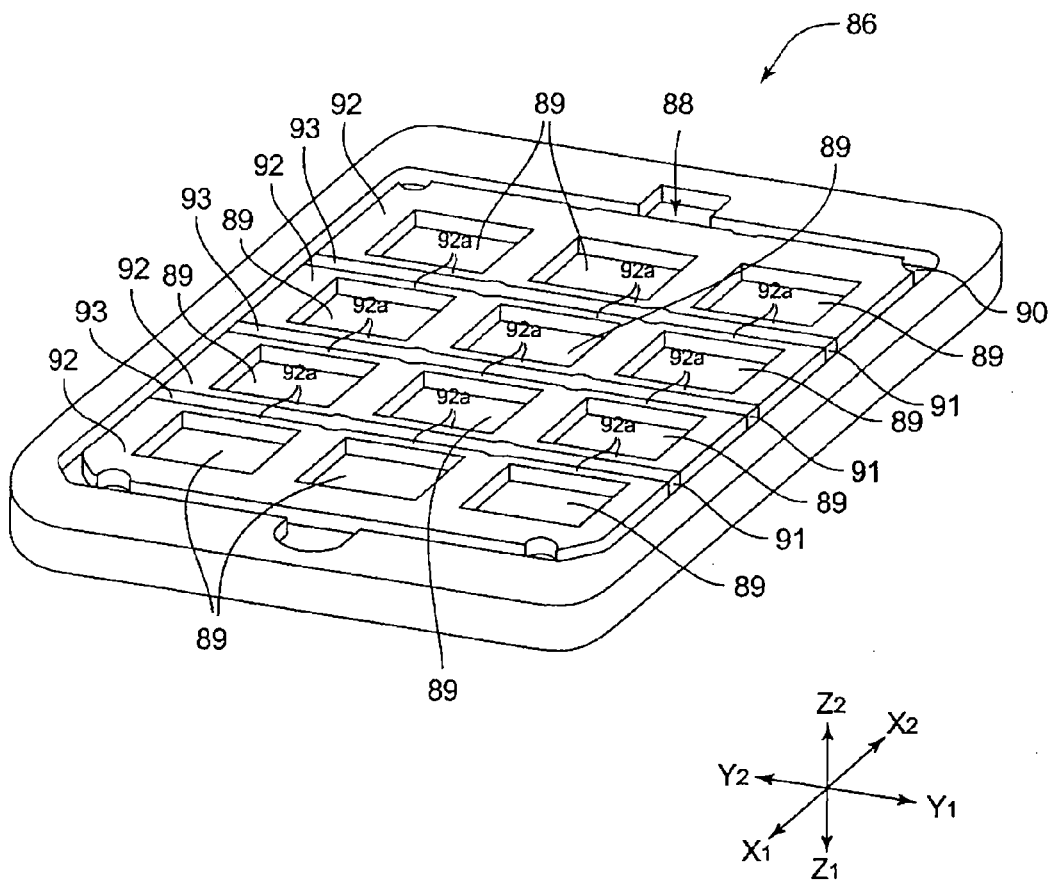
FIG. 13 shows a perspective view illustrating configuration of the receiving jig according to the second embodiment of the present invention.

FIG. 13 shows a perspective view illustrating configuration of the receiving jig 86 according to the second embodiment.

As shown in FIG. 13, the receiving jig 86 has a cavity 88. The cavity 88 comprises part fitting concave portions 89, a frame fitting concave portion 90, and runner fitting concave portions 91 corresponding to the parts 12, the frame 14 and the runners 74 of the resin molded body 70, respectively.

The part fitting concave portions 89 are provided in four rows and three columns with specified intervals. The part fitting concave portions 89 have substantially same shape as the shape of the parts 12. The frame fitting concave portion 90 is provided in a square frame shape surrounding the outside of the part fitting concave portions 89. The runner fitting concave portions 91 are provided along the right-and-left direction between adjacent part fitting concave portions 89.

In the cavity 88, four wall bodies 92 are formed along the forward-and-rearward direction, which are separated by the runner fitting concave portions 91. In each wall body 92, three part fitting concave portions 89 are formed along the right-and-left direction. The wall body 92 has a thin wall between the runner fitting concave portion 91 and the part fitting concave portion 89 (hereinafter called "a side wall 92*a*"). On the runner fitting concave portions 91, elastic bodies 93 are arranged from the left wall to the right wall of the wall bodies 92. The elastic bodies 93 may be made from but not limited to resin such as silicone rubber. The elastic bodies 93 have the same height as the wall bodies 92.

The method for manufacturing the resin molded body 70 and the push button switch member in this embodiment is the same one as the method in the first embodiment. Hereinafter, the different elements of the method in this embodiment from the first embodiment will be described.

Figure 14:
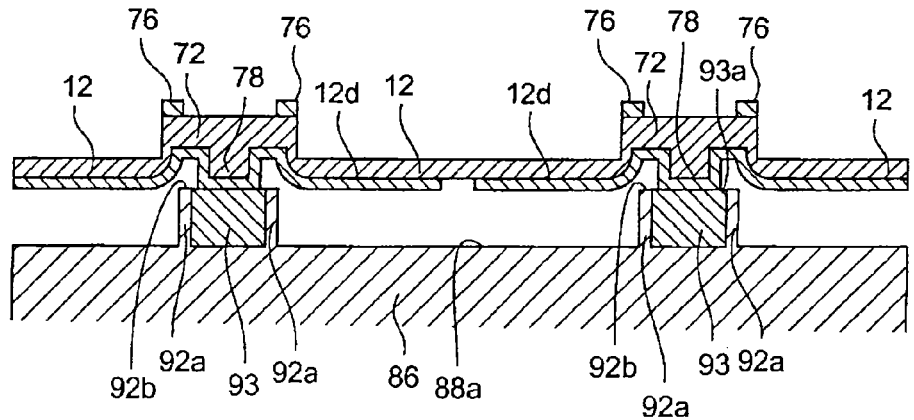
FIG. 14 is a view for explanation of the method for manufacturing the push button switch member according to the second embodiment of the present invention and shows a cross sectional view of a resin molded body arranged on the receiving jig.
Figure 15A:
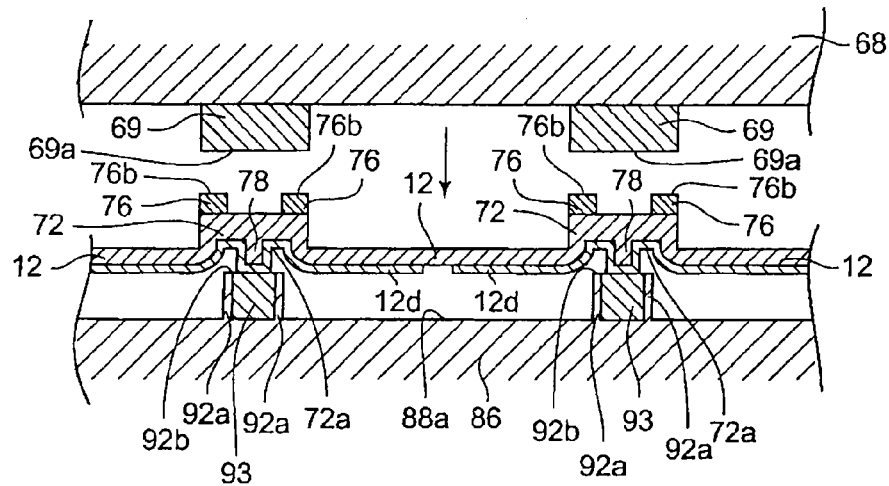
FIG. 15A shows a downward movement process in the method for manufacturing the push button switch member according to the second embodiment of the present invention.
Figure 15B:
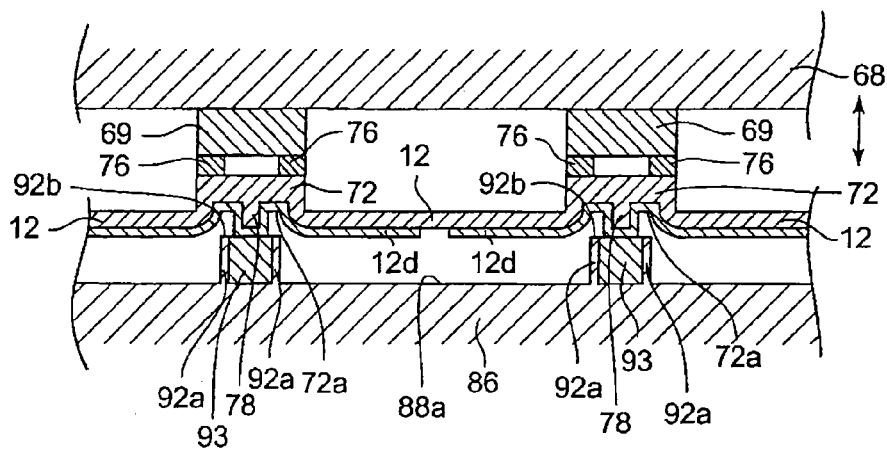
FIG. 15B shows a vibration process in the method for manufacturing the push button switch member according to the second embodiment of the present invention.
Figure 15C:
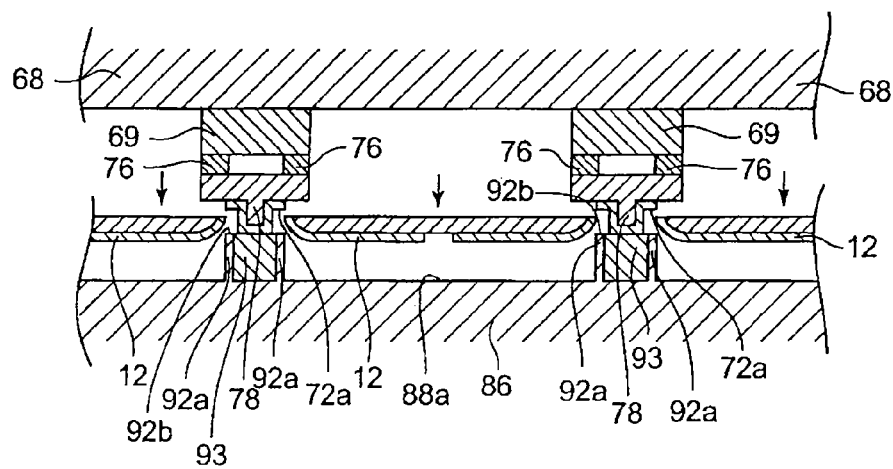
FIG. 15C shows a state that the resin molded parts are separating from the gates.

FIG. 14 is a view for explanation of the method for manufacturing the push button switch member according to the second embodiment and shows a cross sectional view of the resin molded body 70 arranged on the receiving jig 86. FIG. 15A shows a downward movement process in the method for manufacturing the push button switch member according to the second embodiment. FIG. 15B shows a vibration process in the method for manufacturing the push button switch member according to the second embodiment. FIG. 15C shows a state that the resin molded part 12 is separating from the gate 72.

As shown in FIG. 14, the resin molded body 70 is arranged on the receiving jig 86 with the back face being upside (arranging process: S104). In the arranged state, the resin molded body 70 is supported by the elastic bodies 93, wherein the connecting portions 78 of the runners 74 are in contact with the front faces 93*a* of the elastic bodies 93, and wherein the parts 12 are not in contact with a front face 88*a* of the cavity 88.

Then, as shown in FIG. 15A, a horn 68 of an ultrasonic vibrator is brought down from the upside (the back side) of the resin molded body 70 arranged on the receiving jig 86 (downward movement process: S105). As the horn 68 is brought down, an end face 69*a* of each projection 69 contacts to the back face 76*b* of the projection 76. And then, the horn 68 is pressed onto the projection 76, and the connecting portion 78 is slightly pushed into the elastic body 93 (the pushed-in state is not shown in any figures). After that, the ultrasonic vibration is applied to the gate 72 (vibrating process: S106). Then, as shown in FIG. 15C, the parts 12 are separated from the gates 72. The separated parts 12 are grasped by a machine or a person and aligned at predetermined positions in a predetermined assembling jig (aligning process: S107).

Since the connecting portions 78 of the resin molded body 70 formed by the above method are wider than the non-connecting portions 80, the connections between the gates 72 and the runners 74 are strengthened. Therefore, the parts 12 preferentially separate from the gates 72. Additionally, each runner 74 of the resin molded body 70 has a wide portion 82 at substantially center of the non-connecting portion 80 connecting to the gate 72. The wide portion 82 makes the weakest portion in the runner 16 reinforced. Thus, during vibration is applied to the resin molded body 70, the wide portions 82 prevent the runners 74 from being destroyed before the parts 12 are separated from the gates 72.

Also, the resin molded body 70 has the thick portion 83 on the back face of the runner 74 between the connecting portion 78 and the non-connecting portion 80, wherein the thick portion 83 is thickened in front-to-back direction. The thick portion 83 makes the connecting portion 78 strengthened. As a result, the parts 12 are preferentially separated from the gates 72 before the gates 72 separate from the runners 74.

When the resin molded body 70 is arranged on the receiving jig 86, the elastic bodies 93 of the receiving jig 86 support the connecting portions 78 of the gates 72. When the resin molded body 70 is pressed onto the receiving jig 86, the gates 72 are supported by the elastic bodies 93 and by the side wall 92*a*, while the parts 12 are not contacted with the receiving jig 86. Therefore, when vibration is applied to the resin molded body 70, the vibration is effectively transmitted to the gates 72, and the runners 74 are prevented from large vibration. As a result, the parts 12 are easily separated from the gates 73.

The present invention is not limited to the above-mentioned first embodiment and second embodiment but is able to be put into practice in variations.

In the above-mentioned embodiments, twelve parts 12 in total are provided in the resin molded bodies 10, 70, respectively. But, the number of the parts may be more than 13 or less than 11.

In the above-mentioned embodiments, the runners 18, 74 are provided only in the right-and-left direction, but the runners may be provided in the forward-and-rearward direction or in both of the forward-and-rearward direction and right-and-left direction. In these cases, the receiving jigs should be designed to correspond to the runners.

In the above-mentioned embodiments, the shape of the part 12 is a rectangular flat plate, but the shape is not limited to above-mentioned shape, and may be a flat plate having another shape such as a hexagon or a circle.

In the above-mentioned embodiments, a plurality of projections 69 are provided in the horn 68, but the end face of the horn 68 opposing to the resin molded body may be a flat face without any projections.

In the above-mentioned embodiments of the resin molded bodies 10, 70, the parts 12 are arranged inside the frame 14 in four rows and three columns with a specified interval, but a placement of parts is not limited to that, and may be arranged in other layout such as five rows and three columns or the like. Also, other members but the parts 12 which are key tops for a push button switch member may be arranged inside the frame 12.

Figure 16A:
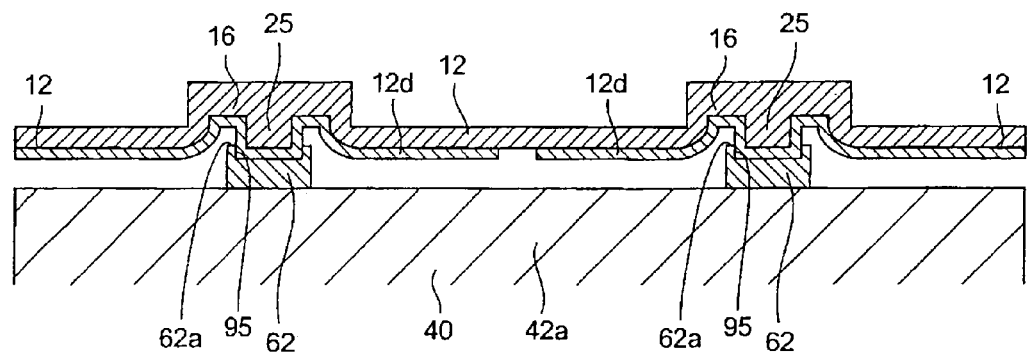
FIG. 16A shows alternative examples of the resin molded body and the receiving jig of the present invention and shows a cross sectional view of the resin molded body arranged on the receiving jig.
Figure 16B:
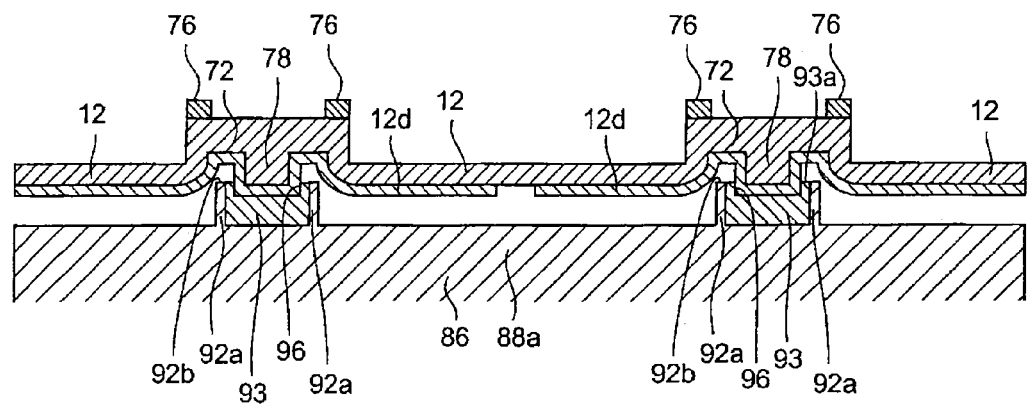
FIG. 16B shows alternative examples of the resin molded body and the receiving jig of the present invention and shows a cross sectional view of the resin molded body arranged on the receiving jig.

In the above-mentioned embodiments, the front face 62*a* of the elastic body 62 and the front face 93*a* of the elastic body 93 have a planar shape, respectively, but a shape of the front faces is not limited to above-mentioned shape. For example, as shown in FIGS. 16A and 16B, the front face 62a may have a concave portion 95 to which the connecting portion 25 is fitted and the front face 93a may have a concave portion 96 to which the connecting portion 78 is fitting.

In the above-mentioned embodiments, when the resin molded bodies 10, 70 are arranged on the receiving jig 40, 86, respectively. The connecting portions 25, 78 are supported by the elastic bodies 62, 93, respectively. But, a formation for an arrangement of a resin molded body and a receiving jig is not limited to that. For example, the elastic bodies 62, 93 may support the non-connecting portions 26, 80, respectively in the above embodiments. Also, an elastic body may be provided in a frame fitting concave portion such as the frame fitting concave portion 46 or the frame fitting concave portion 90 so that the elastic body supports the frame 14.

Figure 17:
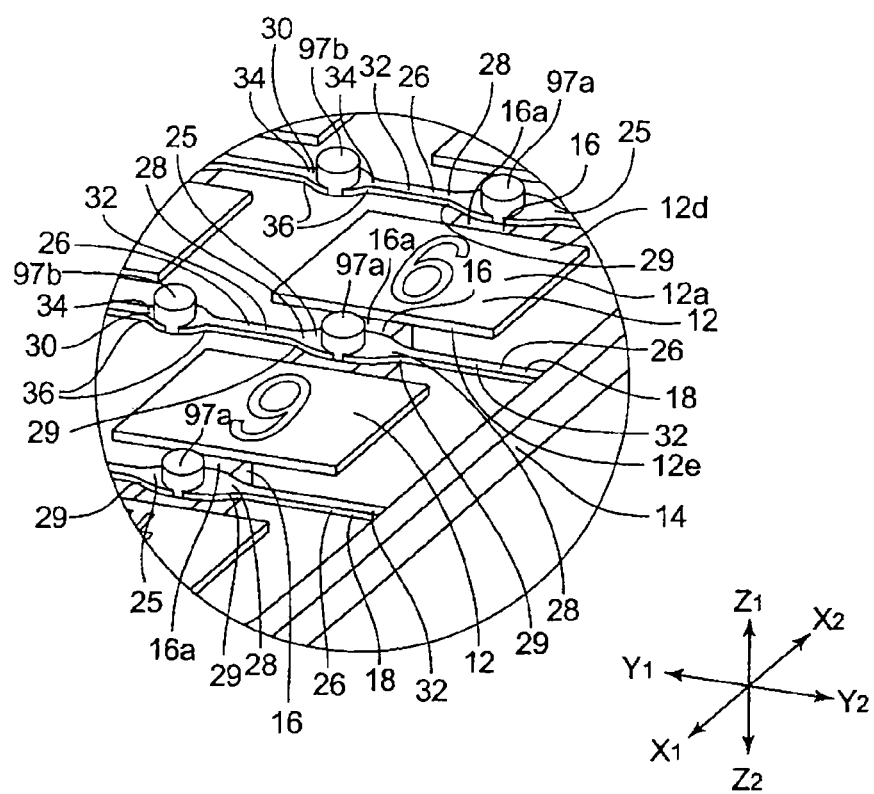
FIG. 17 shows an enlarged view of an alternative example of a resin molded body of the present invention.
Figure 18:
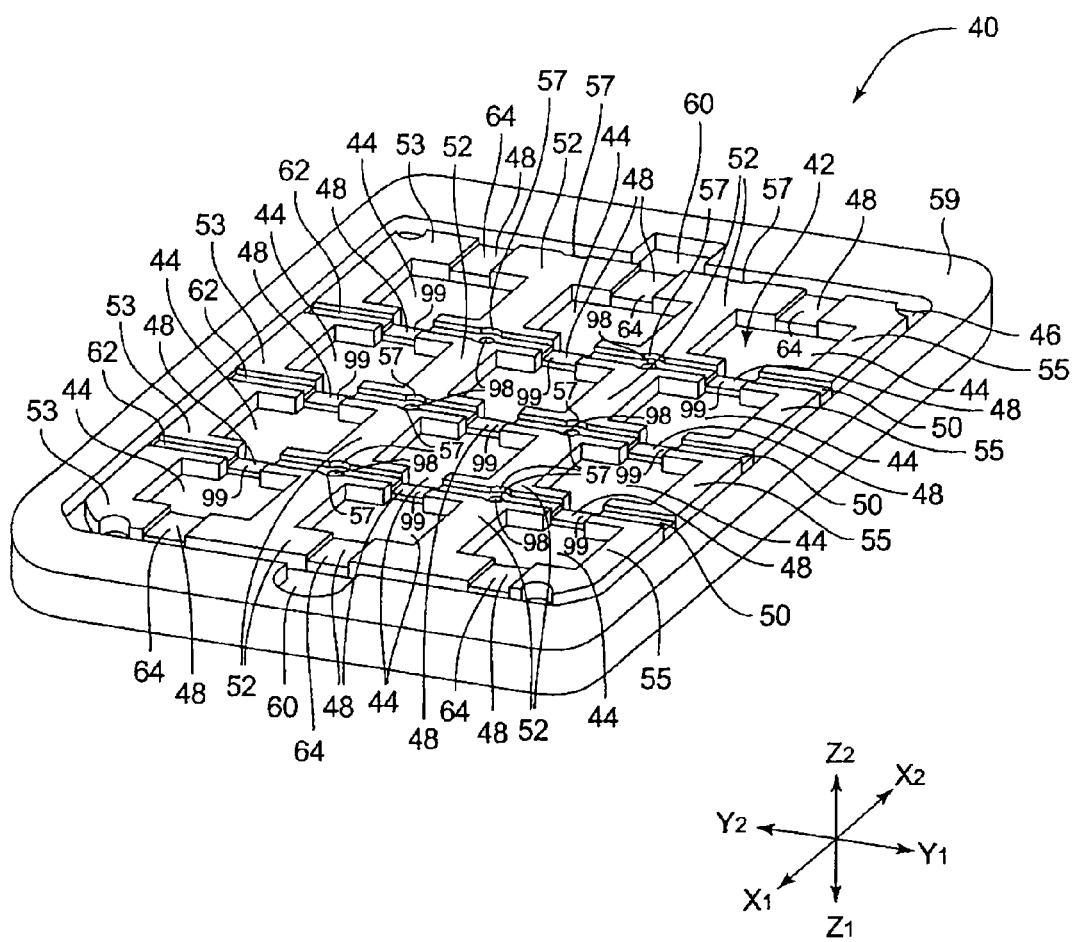
FIG. 18 shows a perspective view of an alternative example of a receiving jig of the present invention, wherein the receiving jig has circular concave portions and groove portions.
Figure 19:
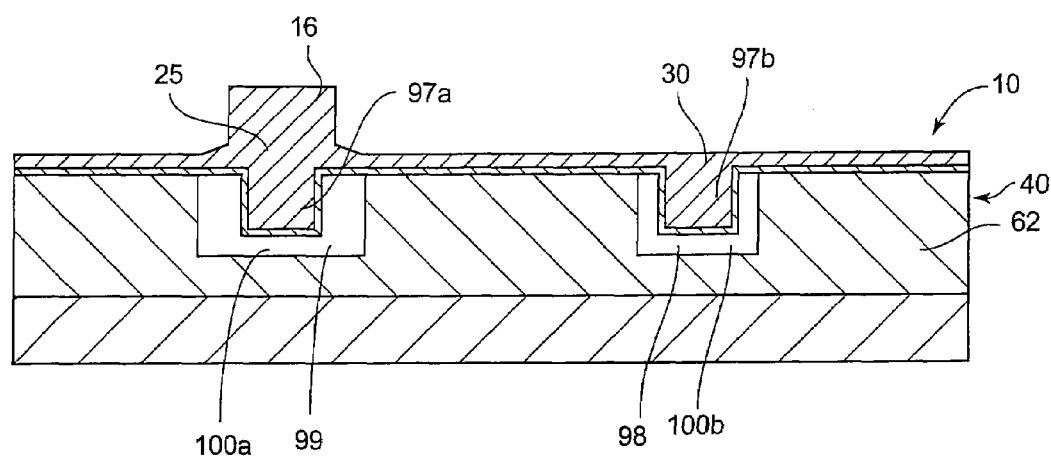
FIG. 19 shows alternative examples of a resin molded body and a receiving jig of the present invention, showing a cross sectional view wherein the resin molded body having the projecting portions is arranged on the receiving jig having the circular concave portions and the groove portions.

In the above-mentioned first embodiment, any projecting portions are not provided on the front face of the elastic body 10 at the connecting portion 25 and at the wide portion 30. But, as shown in FIG. 17, a projecting portion such as a projecting portion 97a and/or a projecting portion 97b may be provided on a front face of the elastic body at a connecting portion such as the connecting portion 25 and/or at a wide portion such as the wide portion 30, wherein the projecting portion protrude from back-to-front direction. In this case, as shown in FIG. 18, the receiving jig 40 preferably has a circular concave portion such as a circular concave portion 98 and/or a groove portion such as a groove portion 99 at positions corresponding to the projecting portions such as the projecting portion 97a and/or the projecting portion 97b of the resin molded body, respectively. The circular concave portion 98 is formed between two indented portions 57 to be indented toward back face in the elastic body 92. The groove portion 99 is formed over the gate fitting concave portion 48 to be indented toward back face in the elastic body 62. In an arrangement of the resin molded body 10 on the receiving jig 40, as shown in FIG. 19, the projecting portion 97a or the projecting portion 97b is fitted in the groove portion 99 or the circular concave portion 98 through a clearance 100a or a clearance 100b, respectively.

Figure 20:
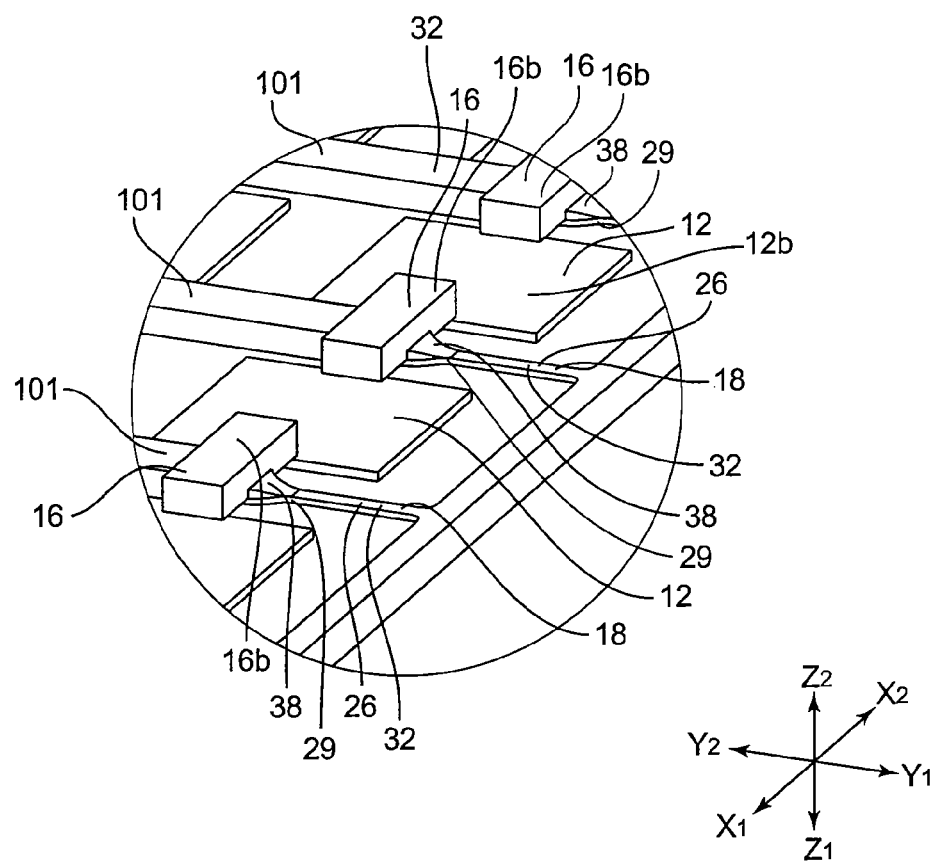
FIG. 20 shows an alternative example of a resin molded body of the present invention, wherein reinforcing members are provided on runners in the resin molded body according to the first embodiment of the present invention.

In the above first embodiment, all shapes of the runners 18 are the same. But, as shown in FIG. 20, a reinforcing portion 101 may be provided on the back face of the runner 18. The reinforcing portion 101 has a larger dimension in cross-section vertical to the right-and-left direction than the dimension of the runner 18.

The resin molded body of the present invention can be used for a push button switch member of various electric equipments.

The present invention has been described in the context of a number of embodiments and variations thereof. It is, however, appreciated that other expedients known to those skilled in the art may be employed without departing from the spirit of the invention. Therefore, it is intended that the appended claims be interpreted as including the embodiments described herein, the alternatives mentioned above, and all equivalents thereto.

What is claimed is:

1. A resin molded body, comprising:
one or more resin molded parts for a push button switch member;
a frame surrounding the outside of the resin molded parts;
one or more gates connecting a plurality of the resin molded parts to each other or the resin molded part to the frame; and
one or more runners crossing the longitudinal direction of the gates,
wherein the gates being connected at the back faces of the resin molded parts not to be coated with light shielding paint, and
the runners are connected to the gates on the same surfaces as the resin molded parts are connected to and are connecting the opposing sides of the frame,
wherein at least either one of the thicknesses or the widths of the runners is smaller than at least either one of them of the gates, respectively, and wherein the widths of the runners connecting to the gates are wider than the widths of the runners non-connecting to the gates.

2. The resin molded body according to claim 1, wherein the runners are designed to be gradually widened in curves from non-connecting portions to connecting portions.

3. The resin molded body according to claim 2, wherein the runners include wide portions formed at the non-connecting portions which connect between the gates.

4. The resin molded body according to claim 3, wherein the wide portions are designed to be gradually widened in the curves.

5. The resin molded body according to claim 4, comprises one or more thick portions connecting the runners to the gates, wherein the thick portions are formed on the same side as the back faces of the resin molded parts.

6. The resin molded body according to claim 3, comprises one or more thick portions connecting the runners to the gates, wherein the thick portions are formed on the same side as the back faces of the resin molded parts.

7. The resin molded body according to claim 2, comprises one or more thick portions connecting the runners to the gates, wherein the thick portions are formed on the same side as the back faces of the resin molded parts.

8. The resin molded body according to claim 1, wherein the runners include wide portions formed at the non-connecting portions which connect between the gates.

9. The resin molded body according to claim 8, wherein the wide portions are designed to be gradually widened in the curves.

10. The resin molded body according to claim 9, comprises one or more thick portions connecting the runners to the gates, wherein the thick portions are formed on the same side as the back faces of the resin molded parts.

11. The resin molded body according to claim 8, comprises one or more thick portions connecting the runners to the gates, wherein the thick portions are formed on the same side as the back faces of the resin molded parts.

12. The resin molded body according to claim 1, comprises one or more thick portions connecting the runners to the gates, wherein the thick portions are formed on the same side as the back faces of the resin molded parts.

13. The resin molded body according to claim 1, comprises one or more thick portions connecting the runners to the gates, wherein the thick portions are formed on the same side as the back faces of the resin molded parts.

* * * * *